US006975406B2

(12) United States Patent
Demarest

(10) Patent No.: US 6,975,406 B2
(45) Date of Patent: Dec. 13, 2005

(54) GLITCH FILTER FOR DISTANCE MEASURING INTERFEROMETRY

(75) Inventor: Frank C. Demarest, Higganum, CT (US)

(73) Assignee: Zygo Corporation, Middlefield, CT (US)

( * ) Notice: Subject to any disclaimer, the term of this patent is extended or adjusted under 35 U.S.C. 154(b) by 435 days.

(21) Appl. No.: 10/211,435

(22) Filed: Aug. 2, 2002

(65) Prior Publication Data

US 2003/0025914 A1   Feb. 6, 2003

Related U.S. Application Data

(60) Provisional application No. 60/309,670, filed on Aug. 2, 2001.

(51) Int. Cl.[7] ............................................... G01B 9/02
(52) U.S. Cl. ..................................................... 356/500
(58) Field of Search ................................ 356/500, 496, 356/497, 498, 511, 516

(56) References Cited

U.S. PATENT DOCUMENTS

| | | | | |
|---|---|---|---|---|
| 3,961,138 A | * | 6/1976 | Fellinger | ..................... 375/362 |
| 4,083,229 A | | 4/1978 | Anway | ....................... 73/40.5 |
| 4,688,940 A | | 8/1987 | Sommargren et al. | ...... 356/349 |
| 5,200,982 A | * | 4/1993 | Weeber | ....................... 375/372 |
| 5,249,030 A | | 9/1993 | Field et al. | ................... 356/349 |
| 5,471,303 A | * | 11/1995 | Ai et al. | ...................... 356/497 |
| 5,530,542 A | | 6/1996 | Kalem et al. | |
| 5,608,523 A | | 3/1997 | Kalem et al. | |
| 5,767,972 A | | 6/1998 | Demarest | ..................... 356/349 |
| 5,835,199 A | * | 11/1998 | Phillips et al. | ............. 356/5.03 |
| 6,072,581 A | * | 6/2000 | Stephenson et al. | ........ 356/521 |
| 6,218,870 B1 | | 4/2001 | Wilson | |
| 6,219,144 B1 | * | 4/2001 | Hill et al. | ................... 356/487 |
| 6,424,407 B1 | * | 7/2002 | Kinrot et al. | .................. 356/28 |
| 6,456,380 B1 | * | 9/2002 | Naganuma | ................... 356/450 |
| 6,597,459 B2 | | 7/2003 | Demarest | ..................... 356/498 |
| 2003/0112444 A1 | * | 6/2003 | Yang et al. | .................. 356/486 |

FOREIGN PATENT DOCUMENTS

| | | | | |
|---|---|---|---|---|
| EP | 0 974 868 A2 | 1/2000 | ............. G03F 7/20 |
| WO | WO98/20623 | 5/1998 | |

OTHER PUBLICATIONS

F. Demarest, "High-resolution, high-speed, low data age uncertainty, heterodyne displacement measuring interferometer electronics", pp. 1024-1030 (Meas. Sci. Technol. 9, Apr. 3, 1998).

N. Bobroff, "Recent advances in displacement measuring interferometry", pp. 907-926 (Meas. Sci. Technol. 4. 1993), no month available.

(Continued)

Primary Examiner—Hwa (Andrew) Lee
(74) Attorney, Agent, or Firm—Fish & Richardson P.C.

(57) ABSTRACT

A method and apparatus used to reduce glitches in measurements made by an accumulation of phase changes over a range greater than $2\pi$. Embodiments of the invention feature the use of a glitch filter that receives a phase input indicating a position value. The glitch filter reduces glitches by using a feedback term that has been reduced modulo $2\pi$.

The method includes measuring a plurality of values of a measurement signal, determining a current position value based on each of the plurality of measured values, wherein determining includes determining a delta value based on a current measured value and a previous position value, wherein the delta value is reduced modulo $2\pi$ to a range of $\pm\pi$, and determining the current position value based on the determined delta value, and outputting at least one of the determined current position value and a velocity value.

38 Claims, 3 Drawing Sheets

OTHER PUBLICATIONS

Oka, K., Tsukada, M. and Ohtsuka, Y., "Real-time phase demodulator for optical heterodyne detection processes", *Meas. Sci. Technol.* 2, 106-110 (1991).

Oldham, N.M., Kramar, J.A., Hetrick et al., "Electronic limitations in phase meters for heterodyne interferometry", *Precision Eng.* 15, 173-179 (1993).

* cited by examiner

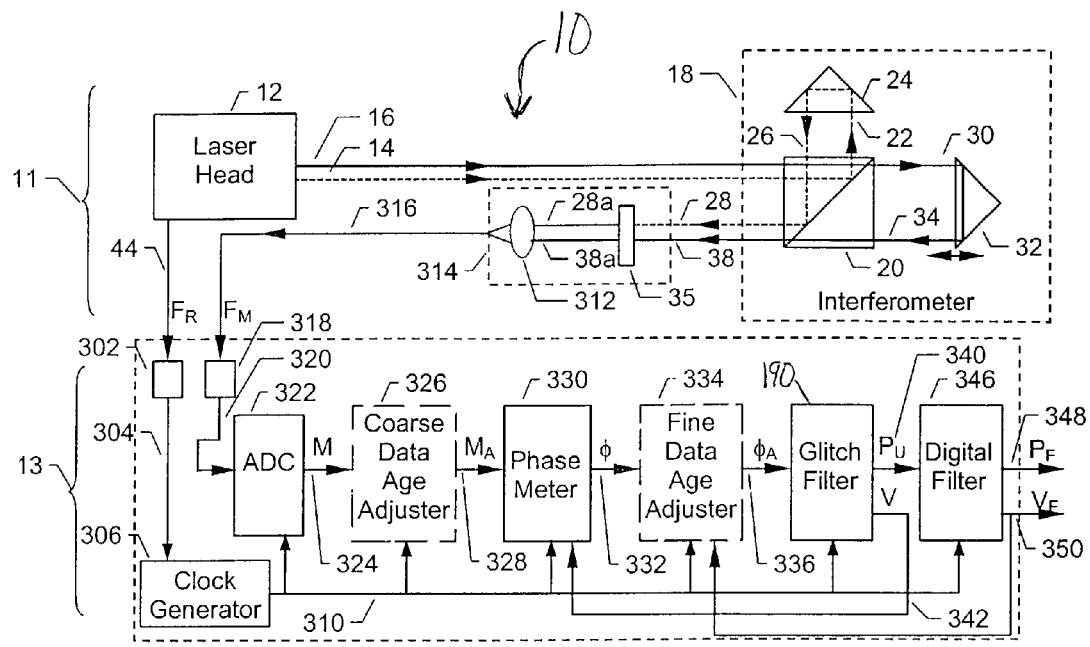
Figure 3
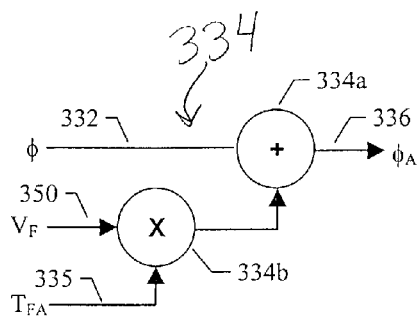
Figure 4 – Fine Data Age Adjuster

GLITCH FILTER FOR DISTANCE MEASURING INTERFEROMETRY

CROSS REFERENCE TO RELATED APPLICATION

Pursuant to 35 USC §19(e), this application claims the benefit of prior U.S. provisional application No. 60/309,670, filed Aug. 2, 2001, which is hereby incorporated by reference.

BACKGROUND

The present application relates generally to methods and apparatuses for measuring changes in length or position; more particularly it relates to displacement measuring interferometry, where the phase of a Doppler signal is measured, and phase changes are accumulated to provide a measurement of the displacement (or relative position) of the motion being measured.

The use of interferometry to measure changes in position, length, distance or optical length is well known, see for example "Recent advances in displacement measuring interferometry" N. Bobroff, Measurement Science & Technology, pp. 907–926, Vol. 4, No. 9, September 1993, "High-resolution, high-speed, low data age uncertainty, heterodyne displacement measuring interferometer electronics" F. Demarest, Measurement Science and Technology, pp. 1024–1030, Vol. 9, No. 7, July 1998, U.S. Pat. No. 4,688,940 issued Aug. 25, 1987, and U.S. Pat. No. 5,767,972 issued Jun. 16, 1998.

A typical displacement measuring interferometer system consists of a frequency-stabilized light source, interferometer optics and measuring electronics. The interferometer optics split the laser light into a reference path and a measurement path, then recombines the light returning from the two paths and directs the recombined light to a photodiode where it produces an interference signal. A distance change of one wavelength in the measurement path relative to the reference path produces a phase change of $2\pi$ radians (360 degrees) in the interference signal. The measuring electronics measure and accumulate the change in-phase of the interference signal and provide a position output for the application.

Many interferometer applications, such as step-and-scan photolithography tools used to manufacture integrated circuits, require measuring multiple axes of motion at high velocity and with high resolution. An advanced photolithography system may include measurement of eight or more axes. The number of axes and limitations on the amount of light available from a common light source combine to limit the amount of light available for each measurement axis. Low light levels results in increased measurement noise or uncertainty.

Noise in the phase measurement may result in "glitches", e.g., spurious measured position changes that are multiples of $2\pi$ when the measured signal levels are low. These glitches occur when an instantaneous noise value results in detection of an extra edge transition, or a phase change greater than $2\pi$, that is accumulated as an actual change in position. These glitches may prevent useful measurement results, or in a production process may result in damaged or defective products.

Prior art methods to reduce glitches typically rely on filtering and/or other processing of the electrical measurement signal. For example, see U.S. Pat. No. 5,608,523.

SUMMARY

According to an aspect of this invention, a method includes measuring a plurality of values of a measurement signal, determining a current position value based on each of the plurality of measured values, wherein determining includes determining a delta value based on a current measured value and a previous position value, wherein the delta value is reduced modulo $2\pi$ to a range of $\pm\pi$, and determining the current position value based on the determined delta value, and outputting at least one of the determined current position value and a velocity value.

One or more of the following features may also be included: The method may include determining the current position value based on the determined delta value comprises accumulating each of a plurality of current delta values. The method may include scaling each of the plurality of current delta values before accumulating. The scaling may be performed using an amplifier. The method may include digitizing the measurement signals to produce a digitized representation of the plurality of measured values, and determining a phase value for one or more of the digitized representations. Determining a delta value may include processing a portion of the digitized representation. The method may include determining the phase values using a frequency-selective process. The frequency-selective process may include at least one of a discrete fourier transform (DFT) and a fast fourier transform (FFT) and a digital Phase Locked Loop (PLL). The method may include determining a center frequency of the frequency-selective process based on the determined velocity value. The method may include adjusting at least one of the measured values using a data age adjustment value to compensate for data age. The method may include determining a dynamic data age adjustment value or a constant data age adjustment value, for at least one of the measured values. The method may use time position values for the plurality of values. The method may include adjusting at least one of the measurement values using a data age adjustment value to compensate for data age. The method may include determining a dynamic data age adjustment value for the at least one of the measurement values, or using a constant data age adjustment value for at least one of the measurement values.

According to a further aspect of this invention, an apparatus includes an electronic processing unit to receive a measurement signal, determine a plurality of measurement values for the received signal and determine a current position value based on each of the measurement values, the electronic processing unit including a filter component to receive a current measurement value and determine a delta value, the determined delta value based on a current measurement value and a previous position value, the determined delta value reduced modulo $2\pi$ to a range of $\pm\pi$, the filter component to determine and output at least one of the current position value and a velocity value.

One or more of the following features may also be included: The filter component may includes a subtractor to subtract the current position value from the current measurement value, and output the delta value. The filter component may include an accumulator to receive and accumulate a plurality of delta values. The filter component may include a scaling component to receive and scale the delta value before accumulating. The apparatus may include a digitizer to convert the measurement signal into digital representations corresponding to each of the plurality of measurement values, and a phase meter to determine a phase value for one or more of the digitized representations. The filter component may process only a portion of each digital representation. The electronic processing unit may include a frequency-selective phase meter to determine a phase value for each of the received measurement signals. The phase meter may determine the phase value by at least one of a discrete fourier transform (DFT), a fast fourier transform (FFT), and a digital Phase-Locked-Loop unit (PLL). A center frequency of the frequency-selective phase meter may be based on the determined velocity value. The apparatus may include a data age adjustment component to determine a data age adjustment value to compensate for data age for each of the measurement values. The data age adjustment value may be determined dynamically or be a constant for each of the values of the measurement signal. The electronic processing unit may include a phase meter component to determine phase values that represent time position values. The apparatus may include a data age adjustment unit to determine a data age adjustment value to compensate for data age. The data age adjustment value may be determined dynamically, or be a constant for each of the values of the measurement signal.

According to a further aspect of this invention, a method of reducing noise in measurement signals from an interferometer includes receiving a measurement signals, determining a plurality of measurement value corresponding to the received signal, determining a current position value based on each of the plurality of measured values, wherein determining includes determining a delta value based on a current measured value and a previous position value, wherein the delta value is reduced modulo $2\pi$ to a range of $\pm\pi$, and determining the current position value based on the determined delta value, and outputting at least one of the determined current position value and a velocity value.

One or more of the following features may also be included: Determining the current position value based on the determined delta value may include accumulating each of a plurality of current delta values. The method may include supporting a wafer on at least one moveable stage, imaging spatially patterned radiation onto the wafer, adjusting the position of the at least one stage relative to the imaged radiation, and measuring the position of the wafer relative to the imaged radiation. The method may include supporting a wafer on at least moveable stage, directing a source of radiation through a mask and lens assembly to produce spatially patterned radiation, adjusting the position of the mask relative to radiation from the source, the lens assembly imaging the spatially patterned radiation onto the wafer, and measuring the position of the mask relative to the radiation from the source. The method may include providing a pattern of radiation using a write beam source, supporting a substrate on at least one stage, directing the write beam of radiation onto the substrate, positioning the at least one stage and the write beam of radiation relative to one another, and measuring the position of the at least one stage relative to the write beam.

According to a further aspect of this invention, an apparatus for reducing noise in measurement signals from an interferometer, the apparatus includes an optical measurement unit to output a plurality of measurement signals, and an electronic processing unit to receive a measurement signal, determine a plurality of measurement values for the received signal and determine a current position value based on each of the measurement values, the electronic processing unit including a filter component to receive a current measurement value and determine a delta value, the determined delta value based on a current measurement value and a previous position value, the determined delta value reduced modulo $2\pi$ to a range of $\pm\pi$, the filter component to determine and output at least one of the current position value and a velocity value.

One or more of the following features may also be included: The filter component may include a subtractor to subtract the current position value from the current measurement value, and output the delta value.

Embodiments of the invention may have one or more of the following advantages. The glitch filter may be used to filter a position value derived from a zero crossing detector and a position accumulator, or derived from a frequency-selective measurement means such as a discrete fourier transform (DFT). In some embodiments, the glitch filter includes an output representing a velocity tracking function. The velocity tracking function may be used to determine the center frequency of a frequency-selective measurement means such as a DFT, a fast fourier transform (FFT) or a digital phase-locked-loop unit (PLL). In some embodiments, the glitch filter includes an unfiltered position output, and/or a filtered position output, each of which represent phase, so that little or no additional hardware or calculation is required to obtain an average phase value for diagnostic or other purposes. Either the filtered or unfiltered position output may be used directly as a position output, or may be filtered by an additional digital filter designed for a specific bandwidth. The glitch filter may be used to replace other circuits in an electronic processing unit of an interferometer thereby reducing the overall circuit complexity and delay of the unit.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is block diagram of a first embodiment of an interferometer system;

FIG. 4 is a block diagram of a fine data age adjuster;

Like reference symbols in the various drawings indicate like elements.

DETAILED DESCRIPTION

Figure 1:
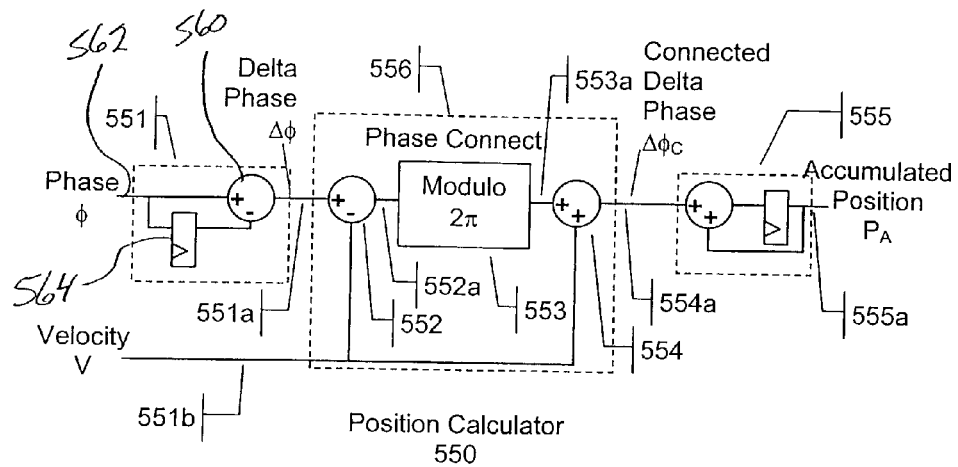
FIG. 1 is a schematic diagram of a position calculator.

FIG. 1 shows a block diagram of a position calculator 550 included in an electronic processing unit of an interferometer system described in U.S. patent application Ser. No. 09/855,473 ("the '473 application") entitled "Data Age Adjustment" by Frank C. Demarest, the contents of which are incorporated herein by reference. The electronic processing unit described in the '473 application included a phase meter to determine the phase difference between a measurement signal and a reference signal. Typically, the phase meter has an effective bandwidth that is much smaller than the measurement signal frequency range, therefore, if the Doppler frequency of the measurement signal exceeds the phase meter measurement rate, a phase ambiguity that is a multiple of $2\pi$ will occur. Position calculator 550 was described as being one possible design for correcting this phase ambiguity. Position calculator 550 includes a delta phase calculator 551 that subtracts consecutive phase values to produce delta phase values on signal line 551a. In some cases, delta-phase calculator 551 produces a delta phase value that combines the noise from consecutive phase values. In more detail, delta-phase calculator 551 includes a subtractor 560 to receive a current position phase value on signal line 562 (the "current value") and a previous position phase value stored in latch 564 (the "previous value"). On every cycle of the electronic processing unit, delta phase calculator 551 subtracts consecutive phase values from each other, i.e., the previous value stored in latch 564 from the current value 562, to produce a delta phase value on signal line 551a. Therefore, the delta-phase values produced on signal line 551a may have up to twice the noise of the input phase value, e.g., the noise in a previous value combined with the noise in a current value. If the combined noise in the delta-phase value 551a exceeds ±π, a position error of 2π (i.e., a "glitch") will result when the value is reduced modulo 2π and accumulated by position accumulator 555.

Figure 2:
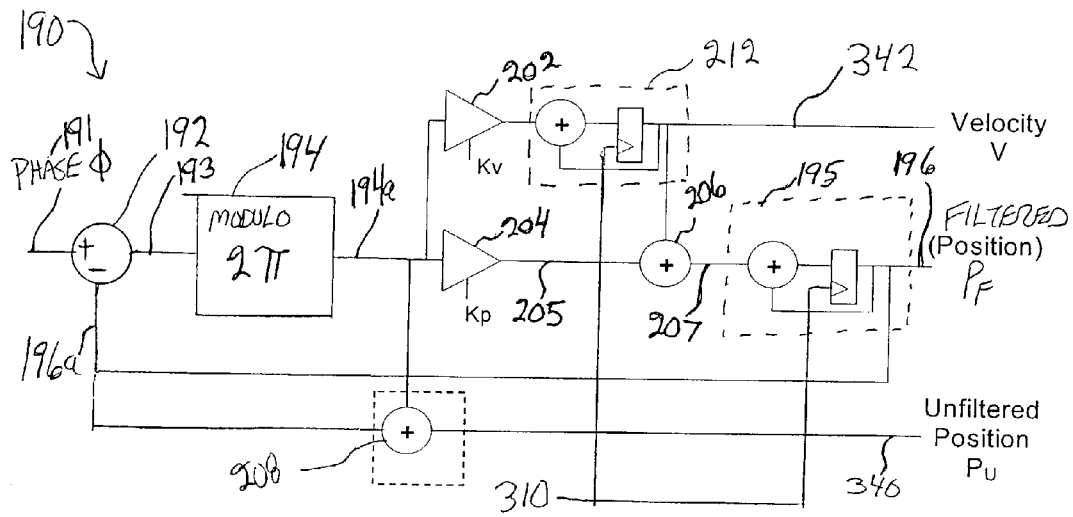
FIG. 2 is schematic diagram of a glitch filter.

FIG. 2 illustrates a glitch filter 190 that replaces position calculator 550 and reduces the occurrence of glitches in an accumulated filtered position value, $P_F$, output on signal line 196. In this description, the units of phase and the units of position are numerically identical, so phase and position values may be combined in calculations. Glitch filter 190 includes a subtractor 192 that receives a current phase value on line 191 and receives a filtered position value, $P_F$, on feedback line 196a. Subtractor 192 outputs a delta phase value on signal line 193 that does not significantly combine noise associated with the previous position because of the use of the filtered position output in the calculation.

In more detail, glitch filter 190 includes a modulo 2π circuit 194 that reduces the delta phase value 193 modulo 2π to a range of ±π and outputs the reduced delta phase value on signal line 194a. The reduced delta phase value 194a is input to both a first amplifier 202 having a velocity gain value of Kv and a second amplifier 204 having a position gain value Kp. A first feedback path through amplifier 204, adder 206 and accumulator 195 acts as a proportional control of feedback term 196, i.e., reducing the instantaneous change included in feedback term 196a. A second feedback path through amplifier 202, integrator 212, adder 206 and accumulator 195 acts as an integral control of feedback term 196, i.e., reducing the average change included in feedback term 196a. The performance of glitch filter 109 may be adjusted by selecting appropriate gain constants for amplifiers 202 and 204. For example, Kp, i.e., the position gain value, is typically adjusted between about $2^{-1}$ to $2^{-4}$ and corresponds to a bandwidth from about 1.6 MHz to about 150 kHz. Kv, i.e., the velocity gain value, is typically adjusted between about $2^{-3}$ to $2^{-9}$. In one embodiment of glitch filter 190, the adjusted values of Kp and Kv are selected so that during an expected range of velocity, acceleration, and jerk, the delta phase value 193, which represents the following error of the glitch filter, is less than ±π, for example less than ±π/4.

In this embodiment, glitch filter 190 outputs a velocity tracking value, V, on signal line 342. The velocity tracking function may be used to determine the center frequency of a discrete Fourier transform (DFT) or other frequency-selective measurement means. Glitch filter 190 may include an optional adder 208 to output an unfiltered full bandwidth position, $P_U$, on signal line 340. Un-filtered position value 340 is then input to and filtered by a digital filter with a desired bandwidth. On a multi-axis system, the use of separate digital filters provides the advantage of exact matching of the dynamic response of the filters for each axis. In this case the operator or user selects filter constants for each filter included in the system.

In some embodiments, the glitch filter operates digitally, i.e., receiving and processing binary representations of phase, feedback and output signals. A signed binary word is used to represent the phase value, which requires a specific number of bits to represent the range of phase values of ±π. For example, if an electronic processing unit has a phase resolution of 2π/8192, a 13-bits signed binary word represents a range of ±π in the phase value. The position value used in electronic processing unit 13 may have a much larger range than the phase value, and may have a binary representation with a relatively larger number of bits.

In one example of glitch filter 190, subtractor 192 may be used to perform the modulo 2π reduction of circuit 194 by selecting an appropriate bit-width of subtractor 192. For example, where a 13-bit signed binary word is used to represent a phase range of ±π, a 13-bit wide subtractor 192 would truncate any bits above the 13th bit of delta phase value 193 while the upper bits of position value 196a would not be input to subtractor 192. The delta phase value 193 output from subtractor 192 would, therefore, be reduced modulo 2π.

In some examples, glitch filter 190 operates at a lower resolution than other parts of the electronic processing unit. For example, if a phase resolution of 2π/8192 is used in the electronic processing unit, a lower resolution of 2π/1024 may be adequate for glitch filter 190 without affecting the resolution of the glitch filter outputs. The lower resolution reduces the hardware requirements of some of the components of glitch filter 190, for example, the bit-width capacity of amplifiers 202 and 204, integrator 212, adder 206, and accumulator 195. However, subtractor 192 and adder 208 have a relatively larger bit-width capacity, in order to output an unfiltered position value, $P_U$, having the higher resolution of the electronic processing unit.

Referring to FIG. 3, glitch filter 190 is shown included in an embodiment of a heterodyne interferometer system 10 that includes an optical measuring unit 11 and an electronic processing unit 13. Electronic processing unit 13 includes an analog-to-digital converter ("digitizer") 322 that samples a measurement signal 320 and outputs digital signal 324 representing the voltage of measurement signal 320, a DFT phase meter 330 for measuring the phase of the measurement signal, and a glitch filter 190 that reduces glitches in a position value 340.

In this example of system 10, optional adder 208 (see FIG. 2) is included in glitch filter 109 to output an unfiltered position value, $P_U$, on signal line 340. Digital filter 346 receives unfiltered position value 340 from glitch filter 190 to produce a filtered position value, $P_F$ 348, and a velocity estimate, $V_F$ 350. Optional data age adjusters 326 and 334 are shown as part of system 10. One or both of data age adjusters 326 and 334 may be included to allow for a selection of an increased delay through unit 13, as will be explained.

During use, system 10 measures changes in the optical path of a single measurement axis. In a multi-axis measurement system, a heterodyne interferometer system may include multiple electronic processing units, similar to electronic processing unit 13, each used for measuring the signal of one axis. When the phase meter utilizes a DFT, the bandwidth of the phase meter is inversely proportional to the length of the DFT. This reduction in bandwidth reduces the uncertainty of the phase measurement and allows operation at lower signal levels. Therefore, the use of a DFT in systems with many axes of measurement is advantageous where the available light from the laser is reduced by being divided among the axes.

Optical measuring unit 111 includes a light source 12 to generate optical radiation, an interferometer 18 to modulate the optical radiation, and a fiber optic pickup 314 to receive the modulated optical radiation from interferometer 18 and couple it into a fiber optic cable 316 as an optical measurement signal having a frequency, $F_M$. As described in more detail below, electronic processing unit 13 receives the measurement signal on fiber optic cable 316 and processes it to provide position and velocity measurements. Light source 12, which is typically a frequency stabilized laser, generates a pair of substantially equal intensity, orthogonally polarized, optical beams 14 and 16 that differ in frequency from each other by difference frequency, $f_o$. Optical beams 14 and 16 are also substantially collinear (although they are shown in FIG. 3 as being slightly transversely displaced from each other). Examples of light source 12 can be found in U.S. Pat. No. 5,249,030, and typically has a difference frequency, $f_o$, of about 20 megahertz (MHz). Of course, the difference frequency, $f_o$, can be lower or higher than 20 MHz. Interferometer 18 modulates optical beam 16 relative to optical beam 14 based on changes in length of the measurement path or position of the measurement object defined by retroreflector 32 relative to the measurement path to first retroreflector 24. Interferometer 18, although shown in FIG. 3 as a linear displacement interferometer, can have any interferometric design that modulates optical beam 16 relative to optical beam 14. Polarization beamsplitter 20 is oriented relative to optical beams 14 and 16 to reflect optical beam 14 as beam 22 to first retroreflector 24 and transmit optical beam 16 as beam 30 to a second retroreflector 32. Retroreflector 24 reflects beam 22 back to the beamsplitter 20 as beam 26 and retroreflector 32 reflects beam 30 back to beamsplitter 20 as beam 34. Beam 34 passes through beamsplitter 20 as output beam 38, and beam 26 is reflected by beamsplitter 20 as an output beam 28. Output beams 28 and 38 are, as are the incoming beams 14 and 16, substantially collinear and orthogonally polarized. Retroreflector 24 is fixed relative to beamsplitter 20 so as to define a fixed length path traversed by beams 22 and 26 through interferometer 18. Second retroreflector 32 is movable relative to beamsplitter 20. Movement or displacement of retroreflector 32 varies the length of the path of optical beams 30 and 34, and, therefore varies the phase of the output beam 38 relative to output beam 28.

Output beams 28 and 38 are directed through a fiber optic pickup 314 including a mixing polarizer 35 to provide each output beam 28 and 38 with components of the same polarization. The resulting similarly polarized beams 28a and 38a are coupled to fiber optic cable 316 by lens 312. The optical signal from fiber optic cable 316 is coupled to fiber optic receiver 318 in electronic processing unit 13. Fiber optic receiver 318 typically includes a photoelectric detector, amplifier, and signal conditioning circuitry (not shown). An interference signal 320 is output from fiber optic receiver 318 and has a frequency, $F_M$. The frequency of measurement signal 320 is $$F_M = f_o \pm nv/\lambda$$

where $\pm nv/\lambda$ is the Doppler shift frequency, v is the velocity of the interferometer element whose position is being measured, $\lambda$ is the wavelength of light and n is 2. The value of n depends on the number of passes the light makes through the interferometer.

Light source 12 also sends a reference signal 44 having a frequency, $F_R$, via a fiber-optic cable to a fiber-optic receiver 302 in electronic processing unit 13. Receiver 302 typically includes a photoelectric detector, amplifier, signal conditioning circuitry, and a zero-crossing detector (not shown). Fiber-optic cables are used between light source 12 and electronic processing unit 13, as well as between the output of fiber optic pickup 314 and electronic processing unit 13 to reduce problems due to electro-static discharge (ESD) and sources of electrical noise. Although fiber optic receivers 302 and 318 are shown in electrical measuring unit 13, several permutations of receivers and fiber-optic cables are possible. For instance, optical processing unit 11 may include a receiver for receiving output beams 28a and 38a.

Clock generator 306 generates system clock signal 310 from reference signal 304. In this embodiment system clock generator is depicted as outputting a single clock signal 310, however system 10 may use more than one clock frequency to reduce the effective clock frequency. For example, ADC 322, coarse data age adjuster 326, and phase meter 330 may use a 120 MHz clock from a clock generator 306 implemented as a Phase Locked Loop (PLL) synchronized to a 20 MHz reference signal 304. Fine data age adjuster 334, glitch filter 338, and digital filter 346 may use a 40 MHz clock with a 10 MHz clock enable. In this case, the lower frequency clock signals, along with clock enable signals, are typically synchronized to reference signal 304 to provide well-defined phase measurements.

Analog-to-digital converter ("digitizer") 322 samples measurement signal 320 and outputs digital signal 324 representing the voltage of measurement signal 320. An optional coarse data age adjuster 326 receives digital signal 324 and outputs an adjusted measurement signal 328. Coarse data age adjuster 326 increases the delay through unit 13 by inserting a selectable number of register delay stages, examples of which are described in the '473 application.

Phase meter 330 converts adjusted measurement signal 328 into a digital measured phase signal 332 by known methods, such as Discrete Fourier Transforms and Fast Fourier Transforms, and known devices, such as Hilbert Transform Phase Detectors and all-digital PLLs. In some embodiments, phase meter 330 is a DFT that includes a CORDIC (Coordinate Rotation by Digital Computer) transform. In this case, the DFT converts a sequence of digital signals 328 into orthogonal X and Y magnitude components. The CORDIC transform converts the X and Y magnitude components into a magnitude and phase representation. The magnitude representation may be used for status or diagnostic purposes. The phase output may be used as the measured phase signal 322, $\phi$.

Referring to FIGS. 4, optional fine data age adjuster 334 receives measured phase signal 332, $\phi$, from phase meter 330 and velocity value 350, $V_F$, from digital filter 346. Fine data age adjuster 334 receives a fine data age adjustment value 335, $T_{FA}$, and calculates an adjusted phase value 336, $\phi_A$, as given by the relationship shown in Equation 2:

$$\phi_A = \phi + T_{FA} V_F. \qquad \text{Equation 2}$$

Appropriate scaling and sign conventions are chosen to obtain the correct result from Equation 2.

In this example, a phase value receives the fine data age adjustment. The range of the fine data age adjustment may exceed $\pm\pi$, without requiring an increase in the range or number of bits of adder 334a, because glitch filter 338 corrects for all $2\pi$ discontinuities.

The coarse and fine age adjustments are shown here as they would appear with a static data age compensation scheme, e.g., a constant data age adjustment value. For a dynamic data age adjustment scheme, the range of dynamic adjustment may be limited to a range that is practical using only the fine adjustment. For a dynamic data age adjustment scheme with a larger range of dynamic adjustment, additional care is required to synchronize the changes in the coarse and fine values. In such a case, the coarse adjustment may be integrated with the phase meter input buffer, and the fine adjustment value may be pipelined to match the pipeline delay of the phase meter. Static data age compensation schemes are described, for example, in U.S. Pat. No. 5,767,972, and dynamic data age schemes are described in the '473 application.

Glitch filter 190 receives adjusted phase signal 336, $\phi_A$, and outputs a velocity tracking output on signal line 342 that is used by phase meter 330 to determine the center frequency of the DFT. Other methods of frequency tracking may be used.

Digital filter 346 (see FIG. 7) receives unfiltered position value 340, $P_U$, from glitch filter 190 and outputs a filtered position value 348, $P_F$, and filtered velocity value 350, $V_F$.

Figure 5:
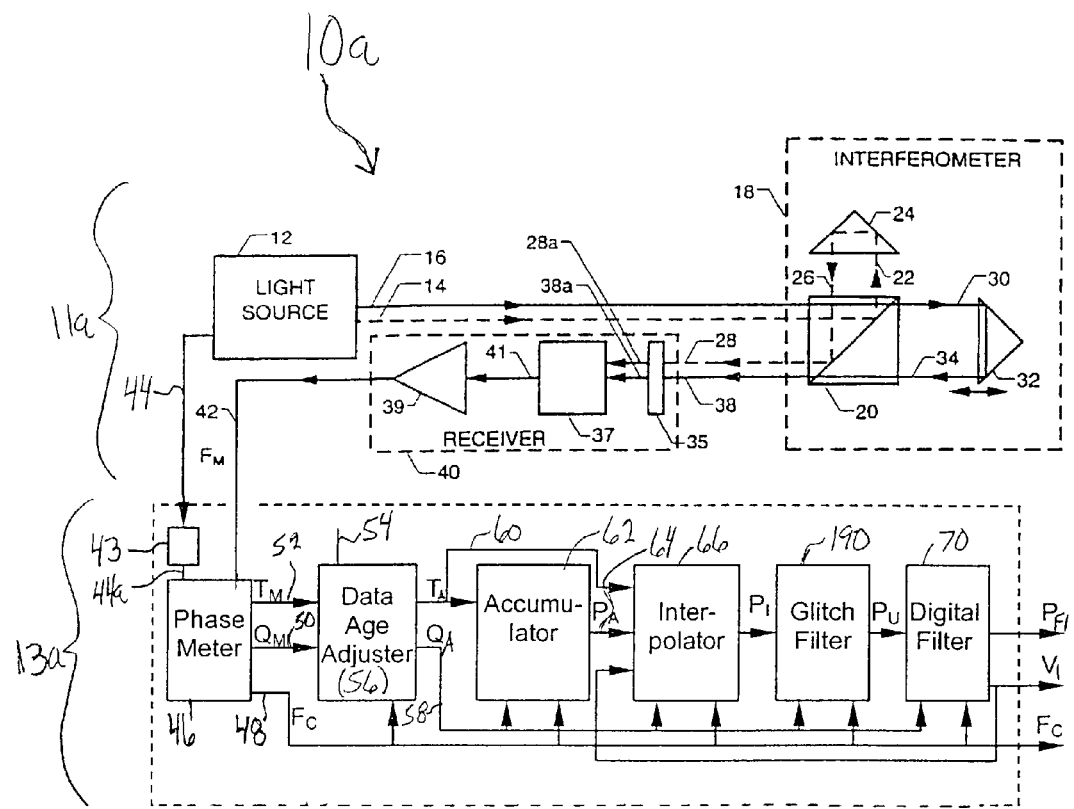
FIG. 5 is a block diagram of an alternative interferometer system.

Referring to FIG. 5, glitch filter 190 is shown included in a second embodiment of a heterodyne interferometer system 10a that includes a zero crossing detector 39 for determining a position value of a measured signal. System 10a is similar to systems described in U.S. Pat. No. 5,767,972, the contents of which are incorporated by reference. In this embodiment, optical measuring unit 11a includes zero-crossing detector 39. Electronic processing unit 13a includes phase meter 46 implemented as a delay line interpolator for measuring the time when the edge occurred, a position accumulator 62, a glitch filter 190 and a digital filter 70. In this example of heterodyne system 10a, optional adder 208 (see FIG. 2) is included in glitch filter 190, and digital filter 70 receives an unfiltered position value to produce a filtered position value, P, and a velocity estimate $V_1$.

A more detailed description of phase meter 46 can be found in "High-resolution, high-speed, low data age uncertainty, heterodyne displacement measuring interferometer electronics" published in Measurement Science and Technology 9:1024–1030 (1998) by Frank Demarest. Additional examples of phase meters can be found, for example, in "Electronic Limitations in Phase Meters For Heterodyne Interferometry", published in Precision Engineering 15:173–179 (1993) by Oldham et al., and "Real-Time Phase Demodulator For Optical Heterodyne Detection Processes", published in Measuring Science Technology 2: 106–110 (1991).

Data age adjuster 56 advances or retards the apparent time that the measurement of measurement signal 42 occurs based on a data age adjustment value 54. By making this adjustment, data age adjuster 56 compensates the data age of measurement signal 42 accounting for differences in optical path, length of fiber-optics, and electronic delay in heterodyne interferometer system 10. Data age adjustment value 54 may be based upon a static data age compensation scheme, e.g., a constant data age adjustment value, or based upon a dynamic data age adjustment scheme. Static data age compensation schemes are described, for example, in U.S. Pat. No. 5,767,972, and dynamic data age schemes are described in the '473 application.

Data age adjuster 56 adjusts the data age of $Q_M$ and $T_M$ to produce a time-adjusted value, $T_A$ and an adjusted edge qualifier, $Q_A$. Data age adjuster 56 applies time-adjusted value, $T_A$, to circuit line 60. Depending on the magnitude of data delay, data age adjuster produces the time-adjusted value, $T_A$, during the same system clock cycle as the corresponding input values, $T_M$ and $Q_M$, or during a later system clock cycle. Circuit line 60 connects to accumulator 62 and interpolator 66. Accumulator 62 converts $T_A$, as described below, into a position difference value, ($\Delta P$), representing the distance traveled between the two measurement times and a summed position value, $P_A$. Accumulator 62 applies summed position value, $P_A$, to circuit line 64 which connects to interpolator 66. Interpolator 66 receives time-adjusted value, $T_A$, and summed position value, $P_A$, and interpolates $P_A$ to compensate for the time difference between when measurement signal 42 occurred and when the measurement was processed relative to system clock 48. Interpolator 66 produces an interpolated position value, $P_I$, representing the measured position at a fixed point within a system clock cycle, i.e., the center of the clock cycle.

Data age adjuster 56 applies an adjusted edge qualifier value, $Q_A$, to circuit line 58. Circuit line 58 connects to accumulator 62, interpolator 66, glitch filter 190 and digital filter 70 so that each of these components in electronic processing unit 13 can use adjusted edge qualifier, $Q_A$, as an indicator to permit certain values of accumulated position, interpolated position, adjusted position and adjusted velocity to propagate through electronic processing unit 13. For example, adjusted edge qualifier value, $Q_A$, may be used to modify the operation of glitch filter 190 and/or digital filter 70 during those cycles of system clock 48 in which there is no new interpolated position value, $P_I$ by holding the previous difference value. This is implemented by controlling the clock enable on registers at appropriate points in the data flow, for example a register (not shown) after the subtractor in glitch filter 109.

Glitch filter 190 receives a position value, in this case interpolated position value, $P_I$, and reduces the potential glitches in the output position value. Internal to glitch filter 190, the delta phase value is reduced modulo $2\pi$, therefore accumulator 62 and interpolator 66, and their position output signals $P_A$ and $P_I$, only require a range of $\pm\pi$ rather than the full position range of the system, resulting in reduced hardware requirements. For example, if the phase resolution of system 10a is $2\pi/1024$, only the least significant 10 bits of $P_A$ and $P_I$ are required, rather than the 40 or more bits required in conventional systems.

Digital filter 70 smoothes unfiltered position value $P_U$ from the glitch filter and produces a filtered position value ($P_{F1}$) and a velocity value ($V_1$).

In an alternate embodiment that does not use digital filter 70, filtered position output $P_F$ and velocity output V from glitch filter 190 may be used A number of embodiments of the invention have been described. Nevertheless, it will be understood that various modifications may be made without departing from the spirit and scope of the invention. For example, there are alternate methods for measuring and processing phase values to provide accumulated position values. The glitch filter design may be modified to meet the design requirements of a particular interferometer, for example, the circuitry associated with producing a velocity output and/or a filter position output may be reduced or eliminated, a third integrator and related circuitry may be added to allow the glitch filter to follow measurement signal accelerations with less error. Gates and/or holding registers may be added to the glitch filter, after the delta phase subtractor, in those cases where the input sample rate is slower than the glitch filter update rate. Also, circuitry may be added to the glitch filter (or the digital filter) to allow preloading of the velocity register to a value based on the signal frequency, for example as determined by the peak magnitude of a DFT or FFT, and circuitry may be added to the glitch filter (or the digital filter) to allow preloading of the position output to any desired value.

The measurement signals processed by the electronic processing unit can be analog or digital depending upon the design of the unit. Digital values can be processed in numerous ways. For example, the radix and the bit widths of the digital values can be varied based on the architecture of the digital components in the electronic processing unit. The value used for the modulo $2\pi$ reduction may be an integer fraction of $2\pi$. Additionally, the digital values can be integer, fractional, floating point, signed, or unsigned values. The sampling rate is normally performed in the baseband Nyquist range, although other Nyquist regions or sampling schemes can be used. The electronic processing units described above process the data signals at the same frequency. Other clocking schemes are possible, such as different rates for the phase meter, glitch filter and/or digital filter, resulting in a slower output data rate of the velocity and position values.

Any or all of the digital processing can be done in software, by a digital signal processor, or other processor. The optical processing unit can include any type of interferometer such as a plane mirror, a differential, or a multiple pass interferometer.

We described amplifiers included in the glitch filter and/or the digital filter perform a scaling operation, i.e., either increasing or decreasing the received delta phase value. Each of the amplifiers may be implemented as amplifiers having a gain, as a multiplier, as a shifter, or as a circuit that causes a shifting operation to occur.

We also referred to an "integrator" 212 and an "accumulator" 195. As will be appreciated by one skilled in the art, the terms "integrator" and "accumulator" are synonymous. However, an "accumulator" function is typically used when describing a circuit that processes digital signals, and an "integrator" function is used when describing a circuit that processes analog signals.

Accordingly, other embodiments are also within the scope of the following claims.

What is claimed is:

1. A method comprising:
   measuring a plurality of values of a time-varying measurement signal from an interferometer, the measured values indicative of changes in position of an object monitored by the interferometer;
   determining a current position value for the object based on each of the plurality of measured values; and
   outputting at least one of the determined current position value and a velocity value,
   wherein the determining comprises:
   determining a delta value based on a current measured value and a previous position value, wherein the delta value is reduced modulo $2\pi$ to a common range spanning $2\pi$, and
   determining the current position value based on the determined delta value.

2. The method of claim 1, wherein determining the current position value based on the determined delta value comprises accumulating each of a plurality of current delta values.

3. The method of claim 2, wherein each of the plurality of current delta values is scaled before accumulating.

4. The method of claim 3, further comprising:
   scaling using an amplifier.

5. The method of claim 1, further comprising:
   digitizing the measurement signal to produce a digitized representation of the plurality of measured values; and
   determining a phase value for one or more of the digitized representations.

6. The method of claim 5, wherein determining a delta value comprises processing a portion of the digitized representation.

7. The method of claim 1, further comprising:
   determining the phase values using a frequency-selective process.

8. The method of claim 7, wherein the frequency-selective process comprises at least one of a discrete fourier transform (DFT) and a fast fourier transform (FFT) and a digital Phase Locked Loop (PLL).

9. The method of claim 7, further comprising:
   determining a center frequency of the frequency-selective process based on the determined velocity value.

10. The method of claim 1, further comprising:
    adjusting at least one of the measured values using a data age adjustment value to compensate for data age.

11. The method of claim 10, further comprising:
    determining a dynamic data age adjustment value for the at least one of the measured values.

12. The method of claim 10, wherein the data age adjustment value is constant for the at least one of the measured values.

13. The method of claim 1, wherein the plurality of values represent time position values.

14. The method of claim 13, further comprising:
    adjusting at least one of the measurement values using a data age adjustment value to compensate for data age.

15. The method of claim 14, further comprising:
    determining a dynamic data age adjustment value for the at least one of the measurement values.

16. The method of claim 14, wherein the data age adjustment value is constant for the at least one of the measurement values.

17. The method of claim 1, wherein the object whose position is being monitored by the interferometer comprises a wafer supported on at least one moveable stage, the method further comprising:
    imaging spatially patterned radiation onto the wafer;
    adjusting the position of said at least one stage relative to the imaged radiation; and
    measuring the position of the wafer relative to the imaged radiation based on the determined current position value.

18. The method of claim 1, wherein the object whose position is being monitored by the interferometer comprises a mask, the method further comprising:
    supporting a wafer on at least one moveable stage;
    directing a source of radiation through the mask and lens assembly to produce spatially patterned radiation;
    adjusting the position of said mask relative to radiation from said source, said lens assembly imaging said spatially patterned radiation onto the wafer; and
    measuring the position of said mask relative to said radiation from said source based on the determined current position value.

19. The method of claim 1, wherein the object whose position is being monitored by the interferometer comprises at least one stage, the method further comprising:
    providing a pattern of radiation using a write beam source;
    supporting a substrate on the at least one stage;
    directing said write beam of radiation onto the substrate;

positioning said at least one stage and said write beam of radiation relative to one another; and measuring the position of said at least one stage relative to said write beam based on the determined current position value.

20. The method of claim 1, wherein the common range is $-\pi$ to $+\pi$.

21. An apparatus comprising:

an electronic processing unit configured to receive a time-varying measurement signal from an interferometer, determine a plurality of measurement values for the received signal, determine a current position value based on each of the measurement values, and output at least one of the current position value and a velocity value, wherein the measurement values are indicative of changes in position of an object monitored by the interferometer, the electronic processing unit including a filter component configured to receive a current measurement value and determine a delta value based on a current measurement value and a previous position value, the determined delta value reduced modulo $2\pi$ to a common range spanning $2\pi$.

22. The apparatus of claim 21, wherein the filter component comprises:

a subtractor to subtract the current position value from the current measurement value, and output the delta value.

23. The apparatus of claim 21, wherein the filter component also comprises:

an accumulator to receive and accumulate a plurality of delta values.

24. The apparatus of claim 23, wherein the filter component also comprises:

a scaling component to receive and scale the delta value before accumulating.

25. The apparatus of claim 21, also comprising a digitizer to convert the measurement signal into digital representations corresponding to each of the plurality of measurement values; and a phase meter to determine a phase value for one or more of the digitized representations.

26. The apparatus of claim 25, wherein the filter component processes only a portion of each digital representation.

27. The apparatus of claim 21, wherein the electronic processing unit includes a frequency-selective phase meter to determine a phase value for each of the received measurement signals.

28. The apparatus of claim 27, wherein the phase meter determines the phase value by at least one of a discrete fourier transform (DFT), a fast fourier transform (FFT), and a digital Phase-Locked-Loop unit (PLL).

29. The apparatus of claim 27, wherein a center frequency of the frequency-selective phase meter is based on the determined velocity value.

30. The apparatus of claim 21, further comprising:

a data age adjustment component to determine a data age adjustment value to compensate for data age for each of the measurement values.

31. The apparatus of claim 30, wherein the data age adjustment value is determined dynamically.

32. The apparatus of claim 31, wherein the data age adjustment value is constant for each of the values of the measurement signal.

33. The apparatus of claim 21, wherein the electronic processing unit includes a phase meter component to determine phase values that represent time position values.

34. The apparatus of claim 33, further comprising:

a data age adjustment unit to determine a data age adjustment value to compensate for data age.

35. The apparatus of claim 34, wherein the data age adjustment value is determined dynamically.

36. The apparatus of claim 34, wherein the data age adjustment value is constant for each of the values of the measurement signal.

37. The apparatus of claim 21, wherein the common range is $-\pi$ to $+\pi$.

38. The apparatus of claim 21, further comprising the interferometer for providing the measurement signal.

* * * * *